US006245414B1

(12) United States Patent
Biagiotti

(10) Patent No.: US 6,245,414 B1
(45) Date of Patent: Jun. 12, 2001

(54) EMBOSSING AND LAMINATING MACHINE FOR GLUING EMBOSSED LAYERS

(75) Inventor: Guglielmo Biagiotti, Lucca (IT)

(73) Assignee: Fabio Perini, S.p.A., Lucca (IT)

(*) Notice: Subject to any disclaimer, the term of this patent is extended or adjusted under 35 U.S.C. 154(b) by 0 days.

(21) Appl. No.: 09/077,229

(22) PCT Filed: Dec. 2, 1996

(86) PCT No.: PCT/IT96/00239

§ 371 Date: Oct. 28, 1998

§ 102(e) Date: Oct. 28, 1998

(87) PCT Pub. No.: WO97/20688

PCT Pub. Date: Jun. 12, 1997

(30) Foreign Application Priority Data

Dec. 5, 1995 (IT) .............................................. FI95A0247

(51) Int. Cl.[7] ............................... B32B 3/00; A01J 21/00; B31F 1/20

(52) U.S. Cl. .......................... 428/172; 428/154; 156/209; 156/219; 156/290; 156/553; 425/385

(58) Field of Search .................................... 428/154, 156, 428/172; 156/209, 219, 290, 358, 553, 558; 162/109, 112, 116, 117, 362; 425/385

(56) References Cited

U.S. PATENT DOCUMENTS 3,414,459 12/1968 Wells ................................... 428/154
3,961,119 6/1976 Thomas ................................ 428/178
5,173,351 * 12/1992 Ruppel et al. ....................... 428/154
5,382,464 * 1/1995 Ruppel et al. ....................... 428/172

FOREIGN PATENT DOCUMENTS 0 370 972 A1 5/1990 (EP) .
0 426 548 B1 11/1994 (EP) .

OTHER PUBLICATIONS

PCT/IT 96/00239 International Search Report.

* cited by examiner

*Primary Examiner*—Donald J. Loney
(74) *Attorney, Agent, or Firm*—Leydig, Voit & Mayer, Ltd.

(57) ABSTRACT

An embossing and laminating machine is described which comprises a first embossing cylinder (3) with a surface provided with a first set of protuberances (P3) disposed with a first pitch in a first direction ($Lx_3$) of alignment and with a second pitch in a second direction ($Ly_3$) of alignment, the said first and the said second direction of alignment forming between them an angle ($\alpha$) other then zero; a second embossing cylinder (5), with its axis (A5) parallel to the axis (A3) of the first embossing cylinder (3), and with a surface provided with a second set of protuberances (P5) disposed with the said first pitch in a third direction ($Lx_5$) of alignment and with the said second pitch in a fourth direction ($Ly_5$) of alignment; and a first and a second pressure roller (7, 9) interacting with the said first and the said second embossing cylinder (3, 5) respectively. The first and the third direction of alignment ($Lx_3$) are inclined with respect to the axes (A3, A5) of the corresponding embossing cylinders (3, 5) such that, in the lamination nip, there is only partial corresponding between the protuberances of one cylinder and the protuberances of the other cylinder.

29 Claims, 15 Drawing Sheets

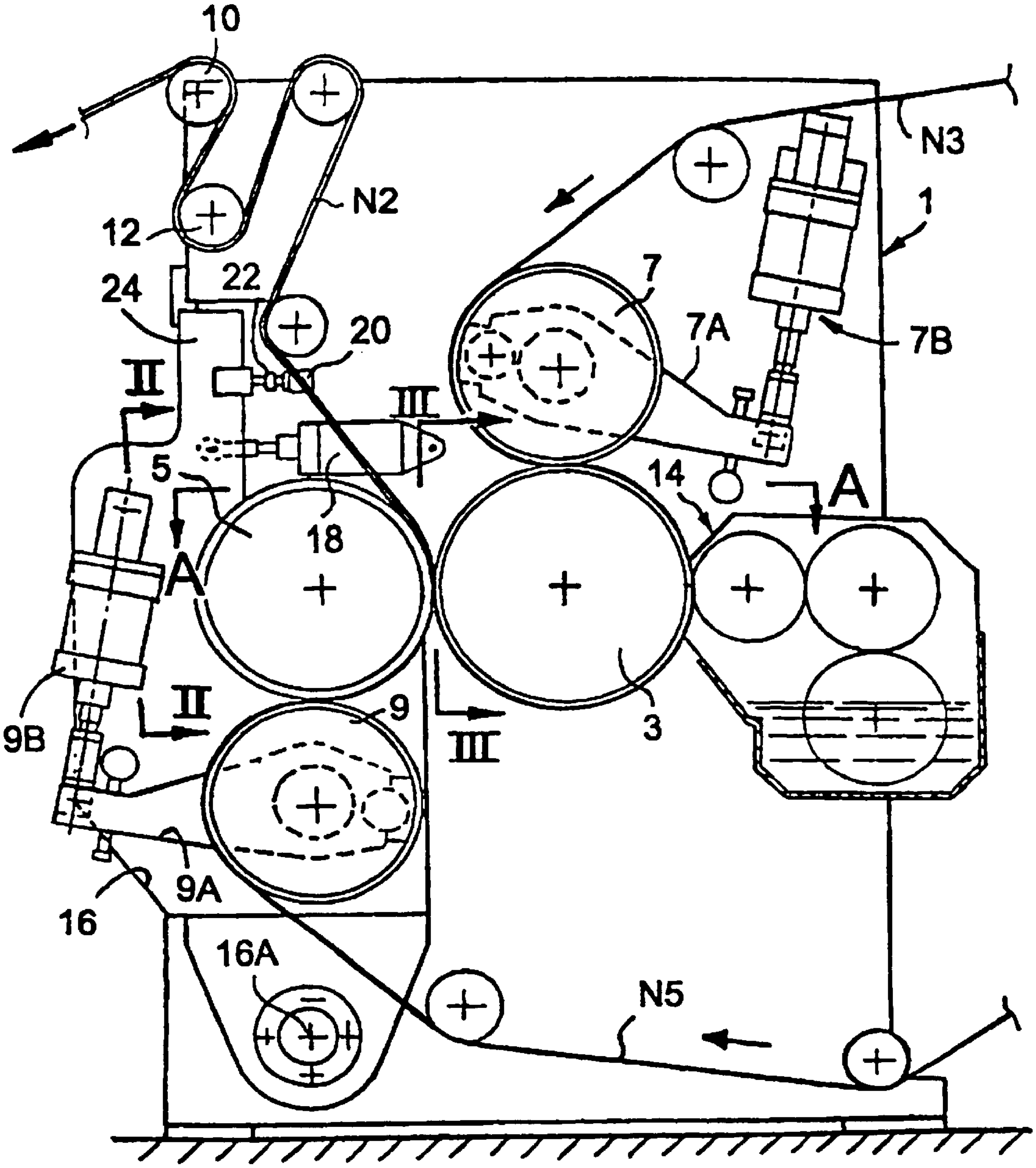
FIG. 1
FIG. 4A
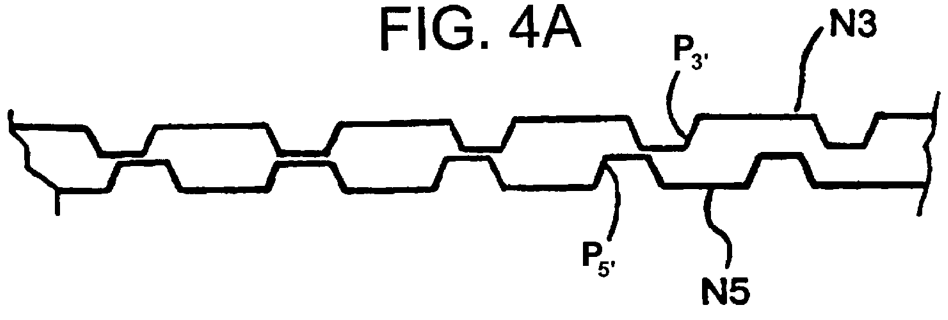

FIG. 13
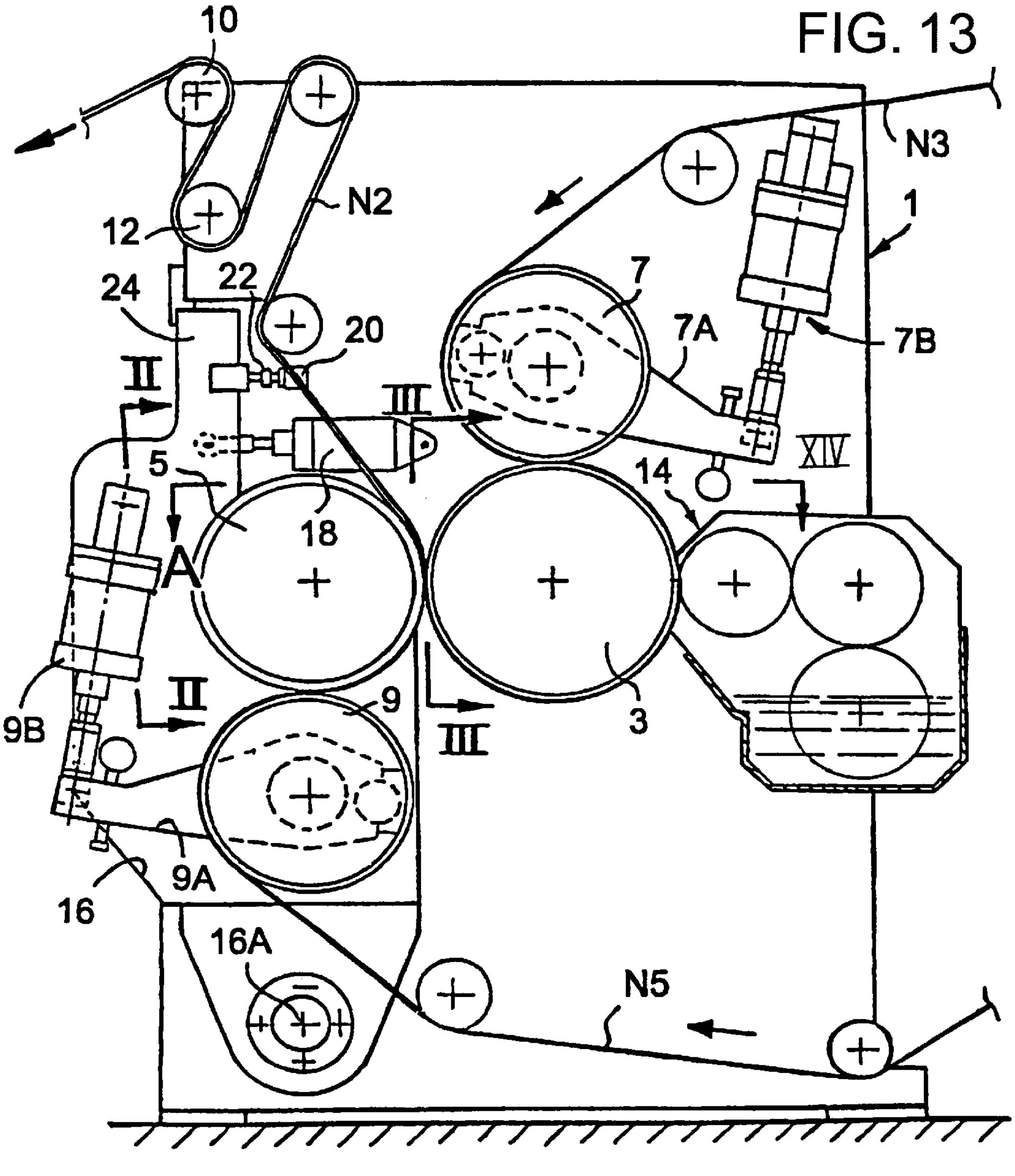
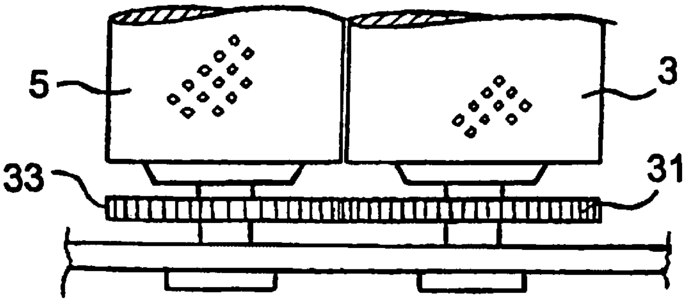
FIG. 14

EMBOSSING AND LAMINATING MACHINE FOR GLUING EMBOSSED LAYERS

DESCRIPTION

1. Technical Field

The invention relates to an embossing machine of the tip-to-tip type comprising two embossing cylinders, each provided with corresponding sets of protuberances, and two pressure rollers, each interacting with a corresponding one of the said two embossing cylinders, to emboss two layers of material in strip form separately and then join the said layers together, using adhesive or some other substance, to form a multiple-layer material in strip form.

The invention also relates to a laminated embossed product, for example a strip of paper wound into a roll, a serviette or a paper tissue or some other item, comprising at least two separately embossed layers, each of the two layers having the same embossed pattern, consisting of a plurality of protuberances disposed in a repeated geometrical pattern in two directions of alignment forming between them an angle other than zero.

The invention further relates to a method of embossing a strip material, comprising the stages of embossing a first layer of indefinite length by forming a first set of protuberances thereon; embossing a second layer of indefinite length, separately from the first, by forming a second set of protuberances thereon; and joining the said two layers to form the said strip material.

2. Prior Art

The embossing machine and the method to which the present invention relates are commonly used for the processing of paper layers for the purpose of forming a semi-finished product intended for the production of rolls of toilet paper, rolls of kitchen towels, tissues, paper serviettes, and the like.

A device and a method of the conventional type are described, for example, in EP-B-0,370,972.

These devices are commonly provided with two symmetrical embossing cylinders such that, in the area of closest approach of the two cylinders, where they are virtually in contact with each other, and where the two layers are joined, there is an exact correspondence between the protuberances of one cylinder and the protuberances of the other cylinder. This produces a strip product in which the protuberances produced on one layer coincide with those of the other layer and adhere to them, the protuberances being pressed against each other after an adhesive has been applied to the protuberances of one of the layers.

In the patent EP-B-0,370,972, the protuberances on the two cylinders are aligned in spirals inclined with respect to the axes of the corresponding cylinders, in order to achieve certain advantageous results. According to the more conventional method, however, the protuberances of the two cylinders are aligned along lines parallel to the axes of the corresponding cylinders, as described in U.S. Pat. No. 3,414,459. In this particular case, the two embossing cylinders are not only symmetrical with respect to each other, but are identical. In both cases, a perfect phase matching is required between the two cylinders, and this requires adjustment time and specialist personnel.

In machining the embossing cylinders, there will inevitably be small errors which normally fall within the acceptable tolerances, since an imperfect match between the protuberances of the two cylinders does not entail a lack of contact, owing to the relatively large dimensions (with respect to the machining tolerance) of the points. However, when a very dense embossed pattern is desired, with protuberances of small dimensions, the machining tolerance of the embossing cylinders is of the same order of magnitude as the dimensions of the points. Consequently, it has been found that, with cylinders provided with very small and very closely-packed protuberances, the two embossed layers are not glued together, owing to the lack of pressure between the points which do not coincide over wide bands. This gives rise to serious problems since, when the strip material is wound into logs and the logs are cut into rolls, or when the material is cut longitudinally to produce serviettes or tissues, part of the final product has to be discarded because its component layers are completely detached from each other.

To overcome these problems, it has been proposed (EP-A-0,426,548) that two layers should be embossed with different patterns, in other words patterns in which in at least one direction of alignment the protuberances of one layer have a different pitch from that of the protuberances disposed in the same direction on the other layer. In this way a strip is obtained in which the layers are glued to each other in restricted areas and not over the whole area of the strip. Gluing is achieved by the lamination of the two layers between embossing cylinders which have protuberances which coincide only in certain areas. The areas of gluing between the layers are, however, sufficiently close that in the final product the two layers have at least one area of reciprocal adhesion.

The problem with this solution consists in the need to produce different embossing cylinders. This requires different tools for the two cylinders, with a doubling of costs.

DISCLOSURE OF THE INVENTION

One object of the present invention is to produce an embossing and laminating machine which overcomes the aforesaid problems of the prior art, and which requires no phase matching between the embossing cylinders.

This and further objects and advantages will be evident from the following text to those skilled in the art.

The invention is based on the recognition of the fact that it is possible to have partial correspondence between the protuberances of one cylinder and the protuberances of the other cylinder by using the same pitch in the alignment of the protuberances on the two cylinders and appropriately varying the inclination of the directions of alignment of the protuberances on the two cylinders.

For example, according to a first embodiment of the invention, two identical directions of alignment of the protuberances on the two cylinders are made to be inclined in the same direction with respect to the axes of the corresponding cylinders, in other words with respect to the corresponding generatrices.

In other words, the protuberances are aligned in two right-hand spirals or in two left-hand spirals on the two cylinders. Additionally, the protuberances are disposed in such a way that there are no alignments parallel to the axes of the corresponding embossing cylinders, contrary to what is the case in U.S. Pat. No. 3,414,459.

Whereas in the conventional art the embossing cylinders are made symmetrical (EP-A-0,370,972) or symmetrical and identical and with alignments parallel to the axes of the cylinders (U.S. Pat. No. 3,414,459) in order to have the protuberances of one cylinder exactly match the protuberances of the other in the contact area, in other words in the area in which the embossed layers are laminated and joined, according to the present invention the cylinders are not symmetrical, in order to avoid having the protuberances in the contact area matching exactly, although the pitch between the protuberances remains the same. This enables the embossing cylinders to be made with the same tool.

According to a different embodiment of the invention, the two homologous directions of alignment of the protuberances of the two cylinders are inclined in opposite directions, but form different angles with the axes of the corresponding cylinders.

In this way, in both cases, the result is an embossed sheet product comprising at least two separately embossed layers, each of which has the same embossed pattern, consisting of a plurality of protuberances disposed in a repeated geometrical pattern in two directions of alignment forming an angle other than zero between them, in which the directions of alignment of the protuberances of the first layer are inclined with respect to the corresponding directions of alignment of the protuberances of the second layer. The protuberances of the first and of the second layer are therefore in contact with each other in restricted areas of the surface development of the final embossed material.

When the two cylinders are made identical to each other, in other words with the homologous directions of alignment inclined at the same angle as well as in the same direction with respect to the axes of the corresponding cylinders, there emerges from the embossing machine an embossed product in which the areas of coincidence of the protuberances of the two layers are aligned in a direction parallel to the direction of advance of the strip material and in a direction perpendicular thereto.

Conversely, when the homologous directions of alignment of the protuberances on the first and second embossing cylinders have two inclinations in the same direction, or in opposite directions, but in any case form different angles with the axes of the corresponding embossing cylinders, a further advantage is obtained in that the areas of coincidence of the protuberances on the two layers (and therefore those on the two cylinders at the point of contact between them) are aligned in directions inclined with respect to the axes of the embossing cylinders. This reduces vibration since contact between the two embossing cylinders is gradual and continuous.

The embossing method according to the invention is therefore characterized in that the homologous directions of alignment of the protuberances of the first and second layers are formed in such a way that, when the two layers are joined, the said directions of alignment are not parallel to each other, the protuberances of the first layer corresponding to the protuberances of the second layer only in restricted areas of the development of the strip material.

Further advantageous embodiments and characteristics of the embossing device, of the corresponding embossing method and of the product obtained by means of the said method are indicated in the attached claims and will be illustrated in greater detail below with reference to some examples of embodiments.

BRIEF DESCRIPTION OF THE DRAWINGS

The invention will be more clearly understood from the description and the attached drawing, which shows a practical and non-restrictive example of the invention. In the drawing:

FIG. 1 is a diagram of the embossing machine;

FIG. 4A shows a schematic section of the strip material in a plane perpendicular to the surface of the material and parallel to one of the directions of alignment of the protuberances;

FIG. 13 is a diagram similar to the diagram in FIG. 1, with embossing cylinders of different diameters;

FIG. 14 is an enlarged schematic view through XIV—XIV in FIG. 13;

DETAILED DESCRIPTION OF EMBODIMENTS OF THE INVENTION

Figure 2:
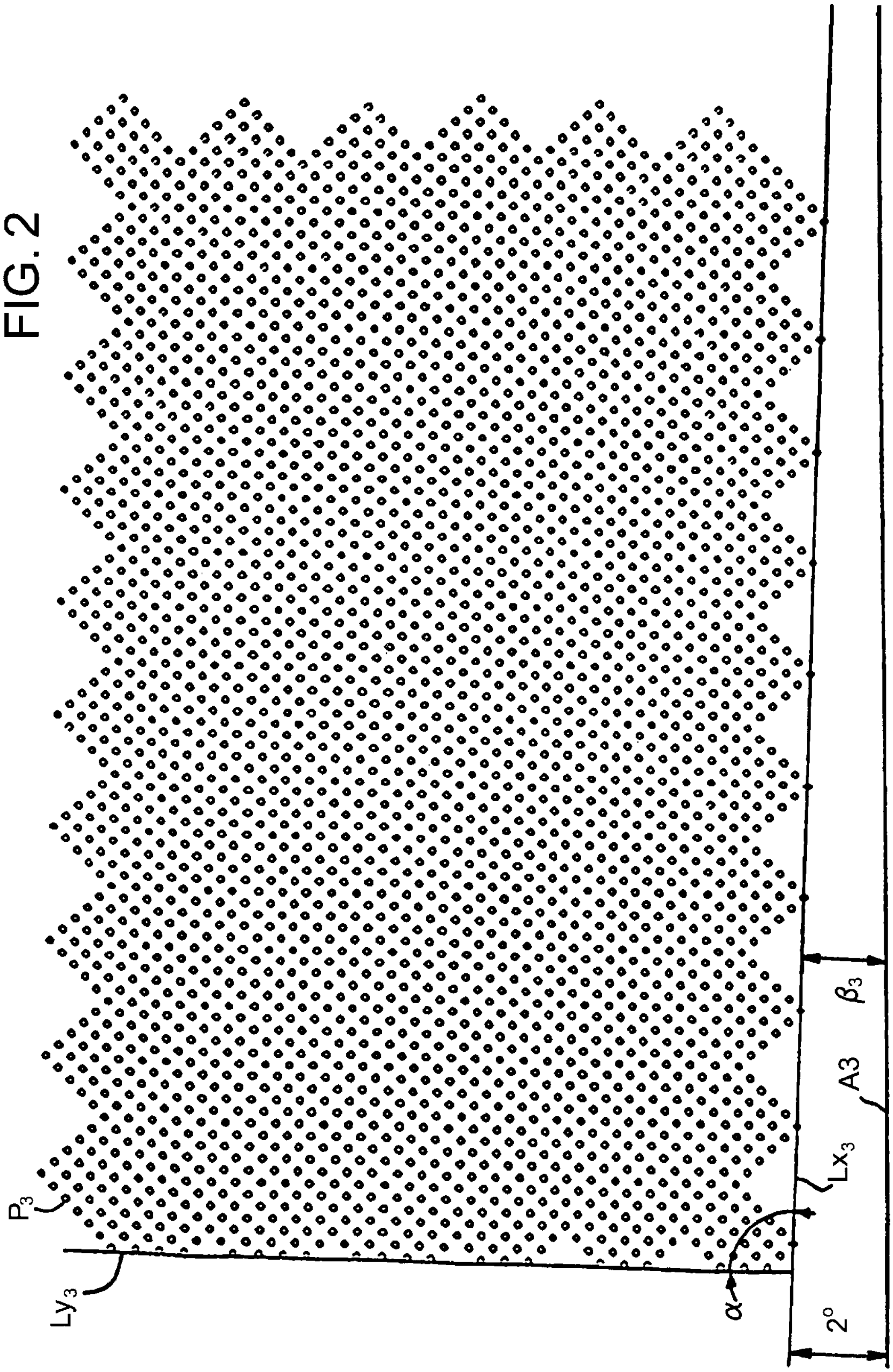
FIGS. 2 and 3 are two views, through II—II and III—III in FIG. 1 respectively, of a portion of the plane development of the cylindrical surfaces of the two embossing cylinders, in a possible embodiment.

With reference to FIG. 1, a known embossing and laminating machine of the tip-to-tip type, indicated overall by the number 1, will be described in a summary way initially.

Two embossing cylinders 3 and 5, disposed with parallel axes and having their surfaces provided with protuberances for embossing, are mounted on the frame of the machine 1. In the nip formed by the two cylinders 3 and 5, the protuberances (or rather some of them, as will be explained subsequently) are in contact with each other.

The embossing cylinder 3 interacts with a pressure roller 7 which may also be provided with an embossed surface, or may be covered with a yielding material such as rubber or the like. The number 9 indicates a second pressure roller similar to the roller 7 and interacting with the embossing cylinder 5. The two pressure rollers 7 and 9 are mounted on corresponding moving elements 7A and 9A which are hinged and subject to an elastic force, for example via two cylinder and piston systems 7B, 9B which press the corresponding pressure rollers against the corresponding embossing cylinders 3 and 5.

N3 and N5 indicate two layers of paper material or the like which are fed between the embossing cylinder 3 and the pressure roller 7 and between the embossing cylinder 5 and the pressure roller 9 respectively, so that they are embossed separately. The two embossed layers remain engaged with the corresponding embossing cylinders 3 and 5 and, after an adhesive has been applied by the unit 14 to the protuberances of the layer N3, are joined together in the nip between the two embossing cylinders 3 and 5, where the protuberances of one embossing cylinder move at a distance which is less than the combined thickness of the two layers N3 and N5 from the protuberances of the other cylinder. In this way the necessary pressure for gluing the two layers and for forming a double strip material N2 is obtained, after which the material is removed by return rollers 10 and 12, or by another known method, to be subjected to further processing on a production line, for example winding into rolls.

In conventional embossing machines, the protuberances of the two embossing cylinders 3 and 5 are made symmetrical, so that all the protuberances of a first embossing cylinder touch or brush against the corresponding protuberances of the other cylinder in the area of tangency of the embossing cylinders. The strip material which is produced is thus joined tip-to-tip over its whole surface.

By contrast with this, according to the invention, the two embossing cylinders 3 and 5 are made in such a way that the same pattern is embossed on both cylinders, but is disposed at inclinations such that there is no superimposition, in other words correspondence, between all the protuberances of one cylinder and all the protuberances of the other cylinder, but there is a superimposition or coincidence in certain areas.

Figure 3:
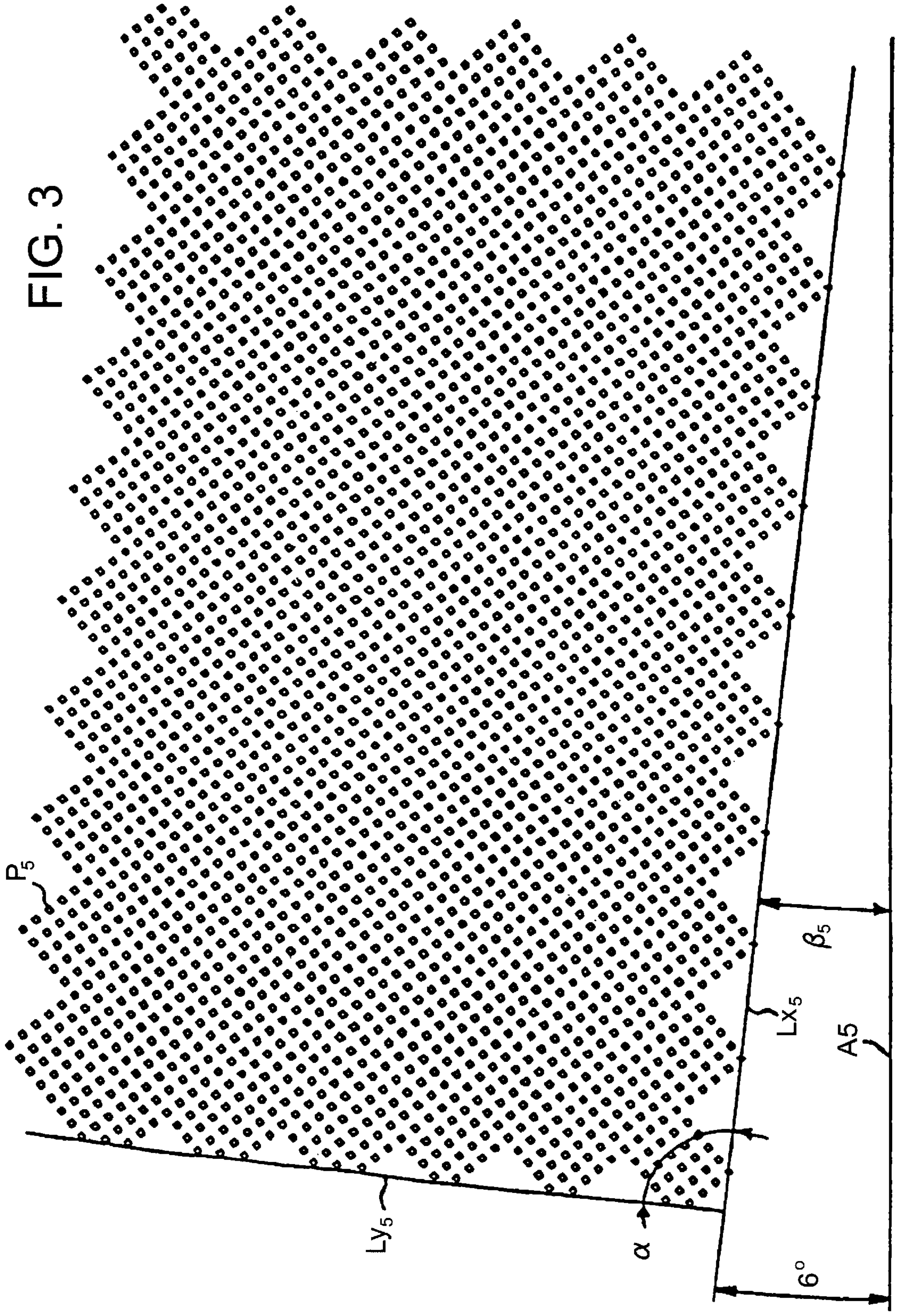

For this purpose, according to a first embodiment, when the two embossing cylinders 3 and 5 are viewed from the same side (lines II—II and III—III in FIG. 1) they show two sets of protuberances (a first set on the embossing cylinder 3 and a second set on the embossing cylinder 5), represented in partial plane development in FIGS. 2 and 3.

The protuberances P3 of the first set (embossing cylinder 3) are aligned in a first and second direction of alignment indicated by $Lx_3$ and $Ly_3$, forming between them an angle $\alpha$ other than zero. In the example illustrated in FIG. 2, the protuberances P3 are disposed with the same pitch along $Lx_3$ and along $Ly_3$, but this need not be so. The direction $Lx_3$ forms an angle P3 of 2° with the direction of the axis A3 of the first embossing cylinder 3.

The protuberances P5 of the second set, on the embossing cylinder 5, are aligned in a third and fourth direction of alignment, indicated by $Lx_5$ and $Ly_5$ in FIG. 3. The directions of alignment $Lx_5$ and $Ly_5$ form between them the same angle a (or at least an angle very close to $\alpha$, for example with a variation of approximately 1–3°), and are orientated in the same direction with respect to the axis A5 of the embossing cylinder 5. The direction $Lx_5$ is inclined downwards from left to right in FIG. 3, as is the direction $Lx_3$ in FIG. 2. The angle $\beta_5$ formed by the third direction of alignment $Lx_5$ with the axis A5 of the embossing cylinder 5 is, in this embodiment, different from the angle $\beta_5$ and is equal to 6°.

Figure 4:
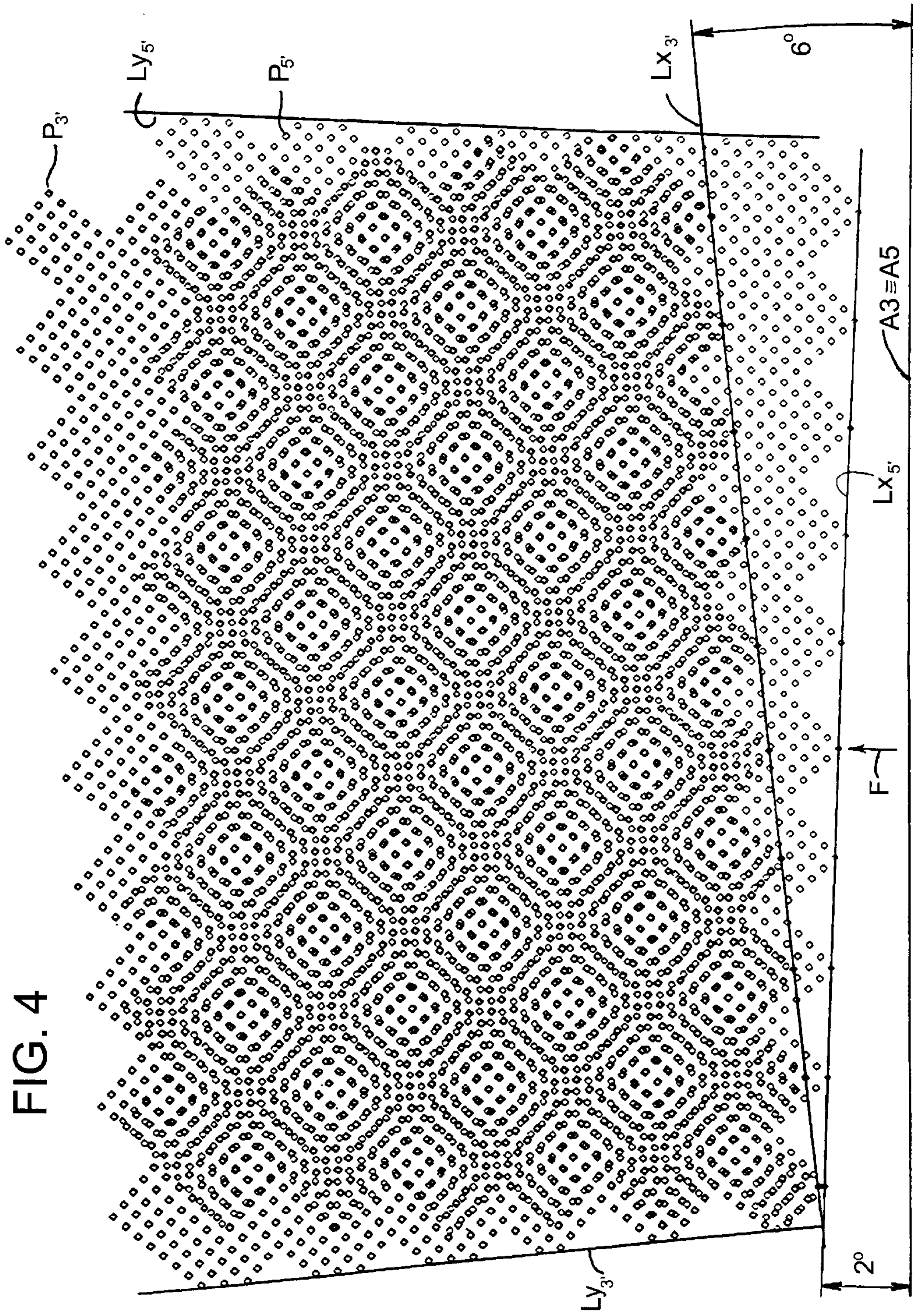
FIG. 4 is a schematic view of a portion of the two embossed and joined layers as they emerge from the embossing machine shown in FIGS. 1 to 3.

Protuberances P3' and P5' are impressed on the two layers N3 and N5 in a pattern corresponding to that formed by the protuberances P3 and P5 on the two embossing cylinders 3 and 5 respectively. Consequently, after the two layers have been joined, there is no superimposition or coincidence of each protuberance of one layer with a corresponding protuberance of the other layer, but, as shown in FIG. 4, there is a correspondence in certain areas. The areas in which the protuberances coincide are separated from each other by areas in which the protuberances on one layer do not coincide with the protuberances of the other layer. Additionally, the areas in which the protuberances P3' and P5' coincide are aligned in two alignments which are not parallel to the axes A3 and A5 of the two embossing cylinders 3 and 5. This means that, as the two layers N3 and N5 are joined, the protuberances P3 and P5 of the two embossing cylinders come into contact gradually in the area of lamination (in other words, of joining) of the strips, with an advantageous reduction in the vibration of the machine, mechanical stresses and noise.

In FIG. 4, $Lx_3'$, $Ly_3'$ and $Lx_5'$, $Ly_5'$ indicate the directions of alignment of the protuberances P3' and P5' on the first and second layer respectively. The letter F indicates the direction of advance of the strip material leaving the embossing machine.

Figure 5:
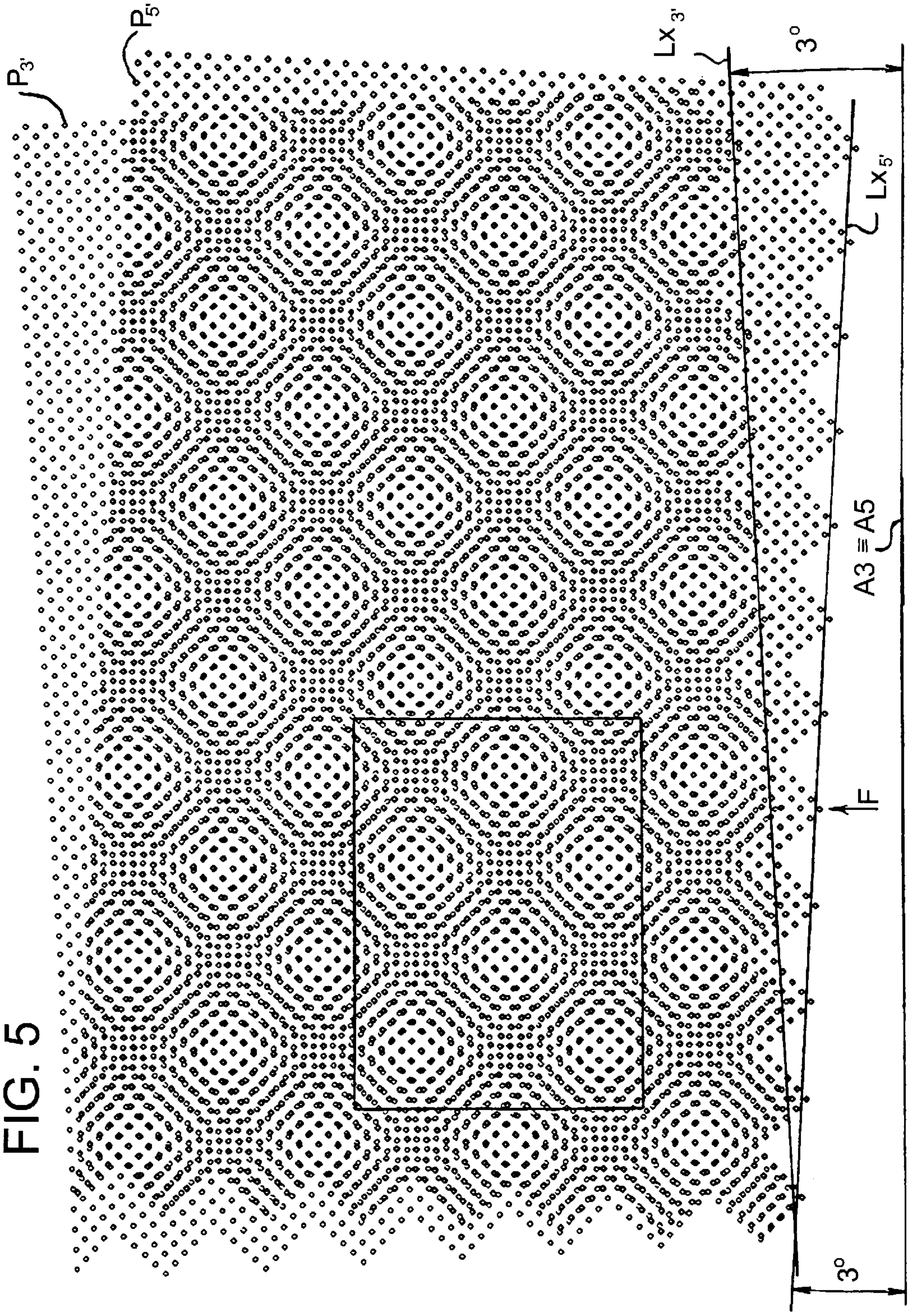
FIG. 5 is a view, similar to that in FIG. 4, of two joined layers produced by two identical embossing cylinders.

When the two directions of alignment $Lx_3$ and $Lx_5$ are inclined at the same angle, for example $\beta_3=\beta_5=3°$, there is once again the advantage of having coincidence in certain areas of the protuberances of the joined layers N3 and N5, but the areas of coincidence are disposed in an alignment parallel to the axes of the embossing cylinders 3 and 5, as shown in FIG. 5. In this case, the advantage of reduction in vibration is lost. However, there is the advantage of making two perfectly identical embossing cylinders 3 and 5.

Figure 6:
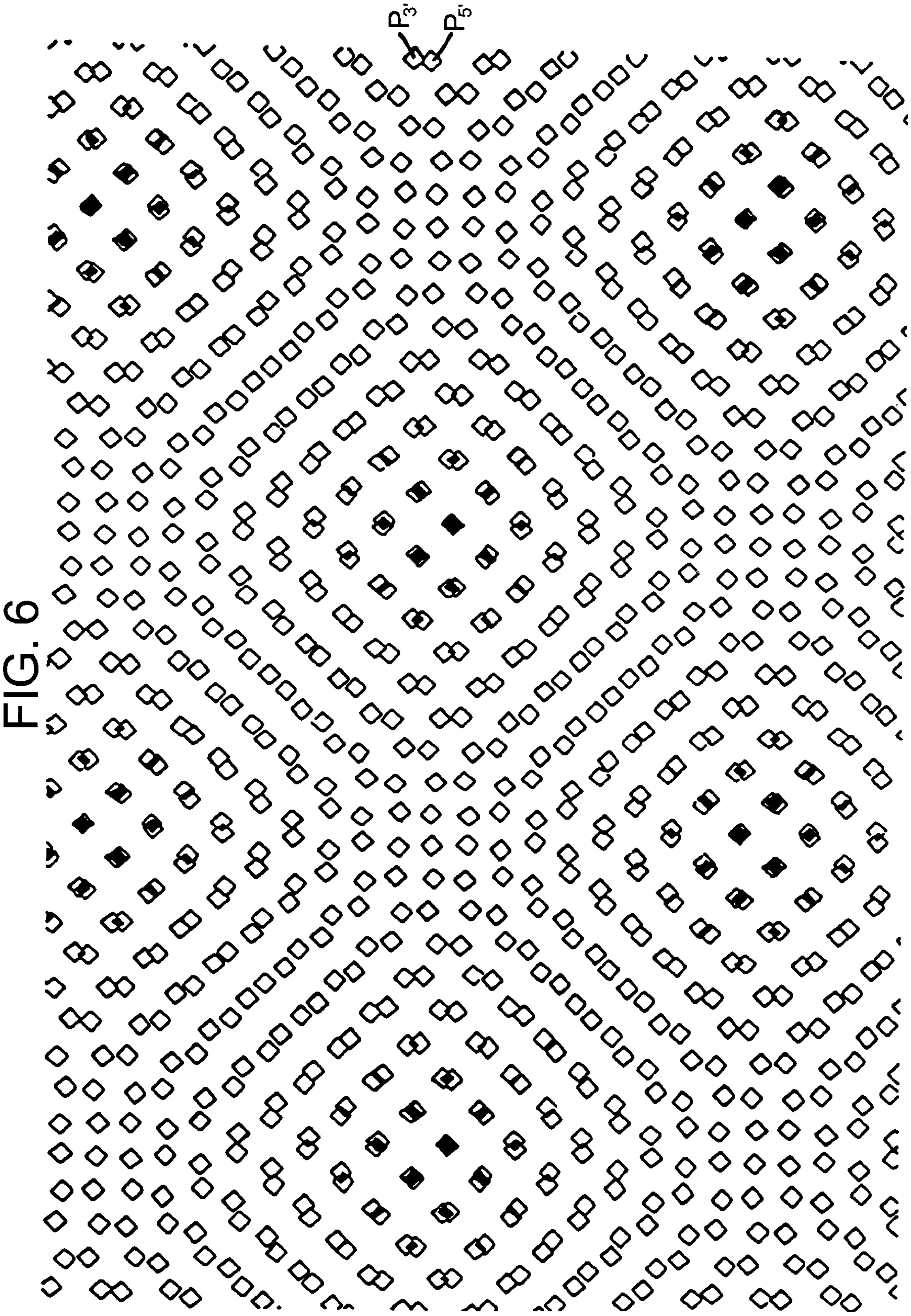
FIG. 6 shows an enlargement of a portion of FIG. 5.

FIG. 6 shows a schematic enlargement of FIG. 5, where the areas of coincidence of the protuberances P3' and P5' are clearly visible.

Figure 7:
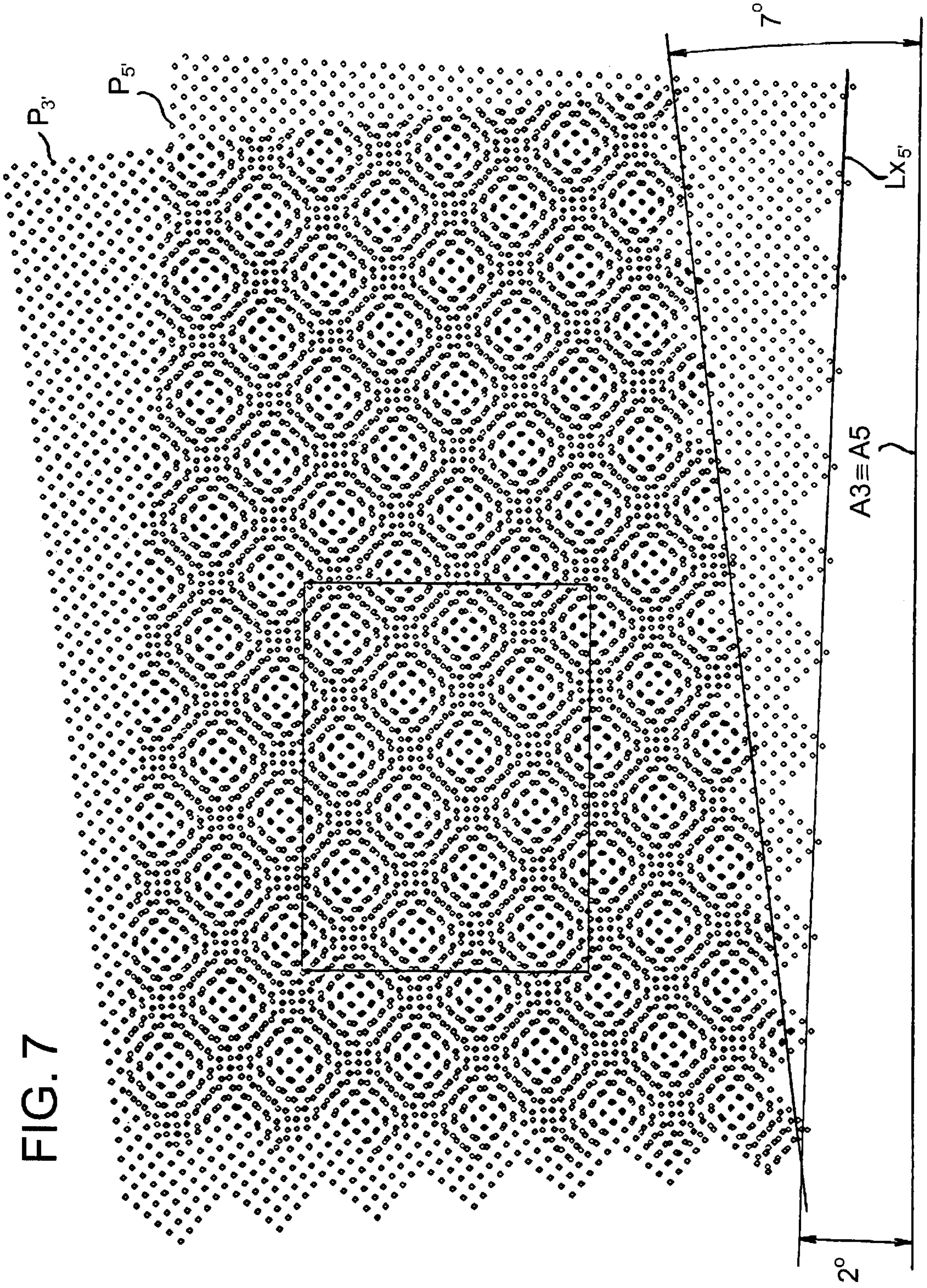
FIGS. 7 and 8 show a view of two joined layers and an enlargement of the glued areas of the layers, with a different inclination of the directions of alignment of the protuberances on the two embossing cylinders.
Figure 8:
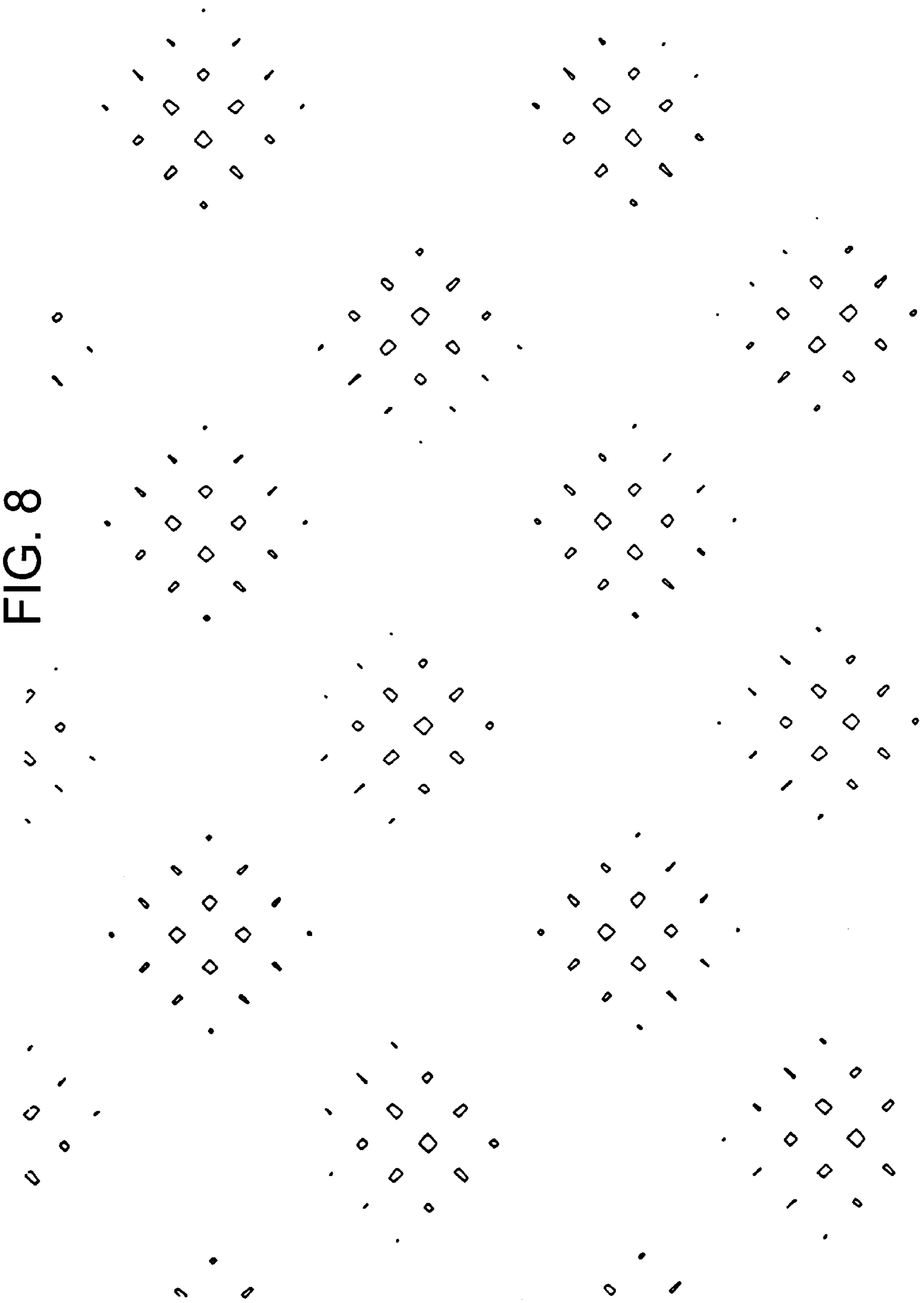
Figure 9:
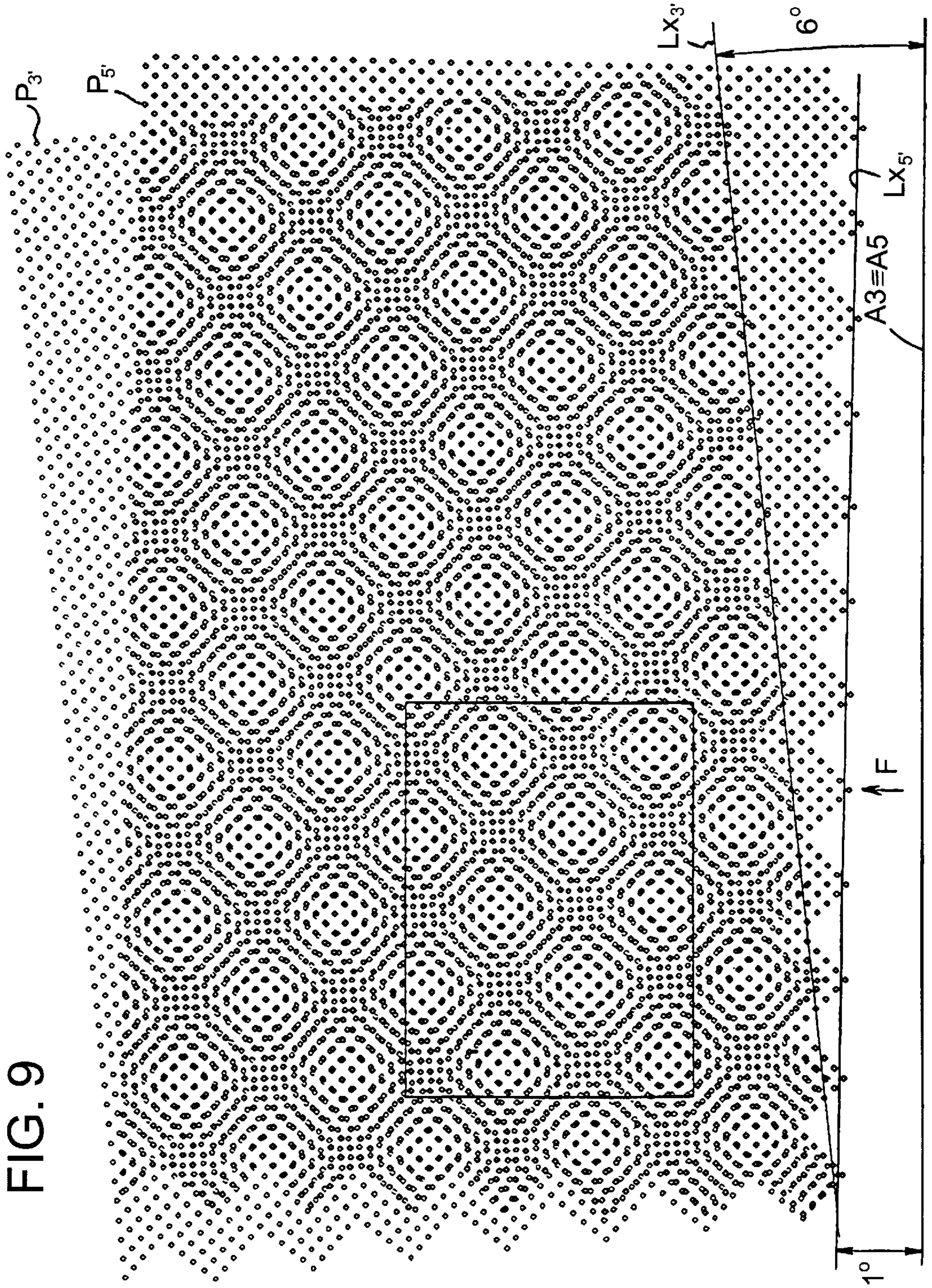
FIGS. 9 and 10 show a view of two joined layers and an enlargement of the glued areas of the layers produced with another, different, inclination of the directions of alignment of the protuberances on the two embossing cylinders.
Figure 10:
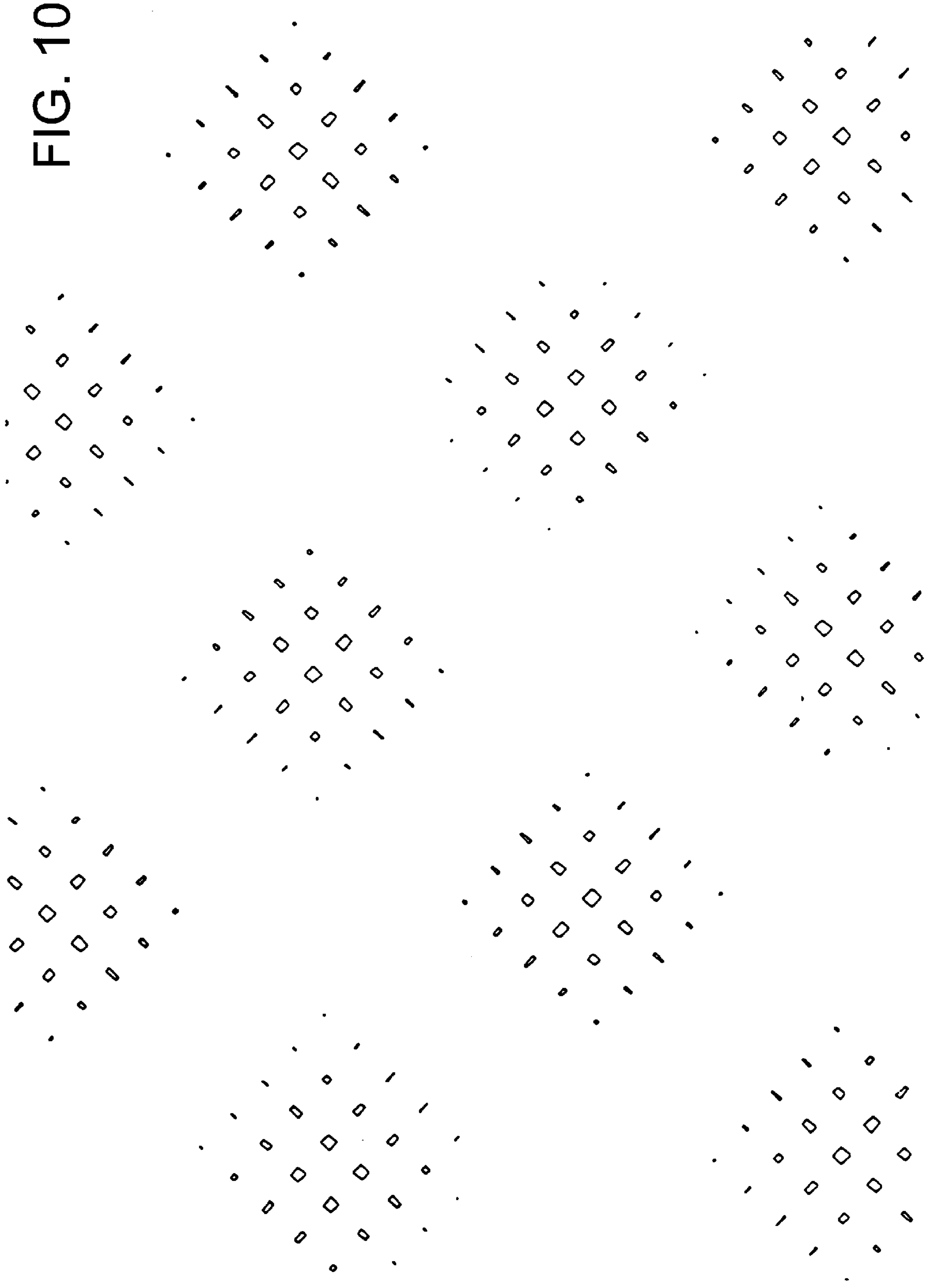
Figure 11:
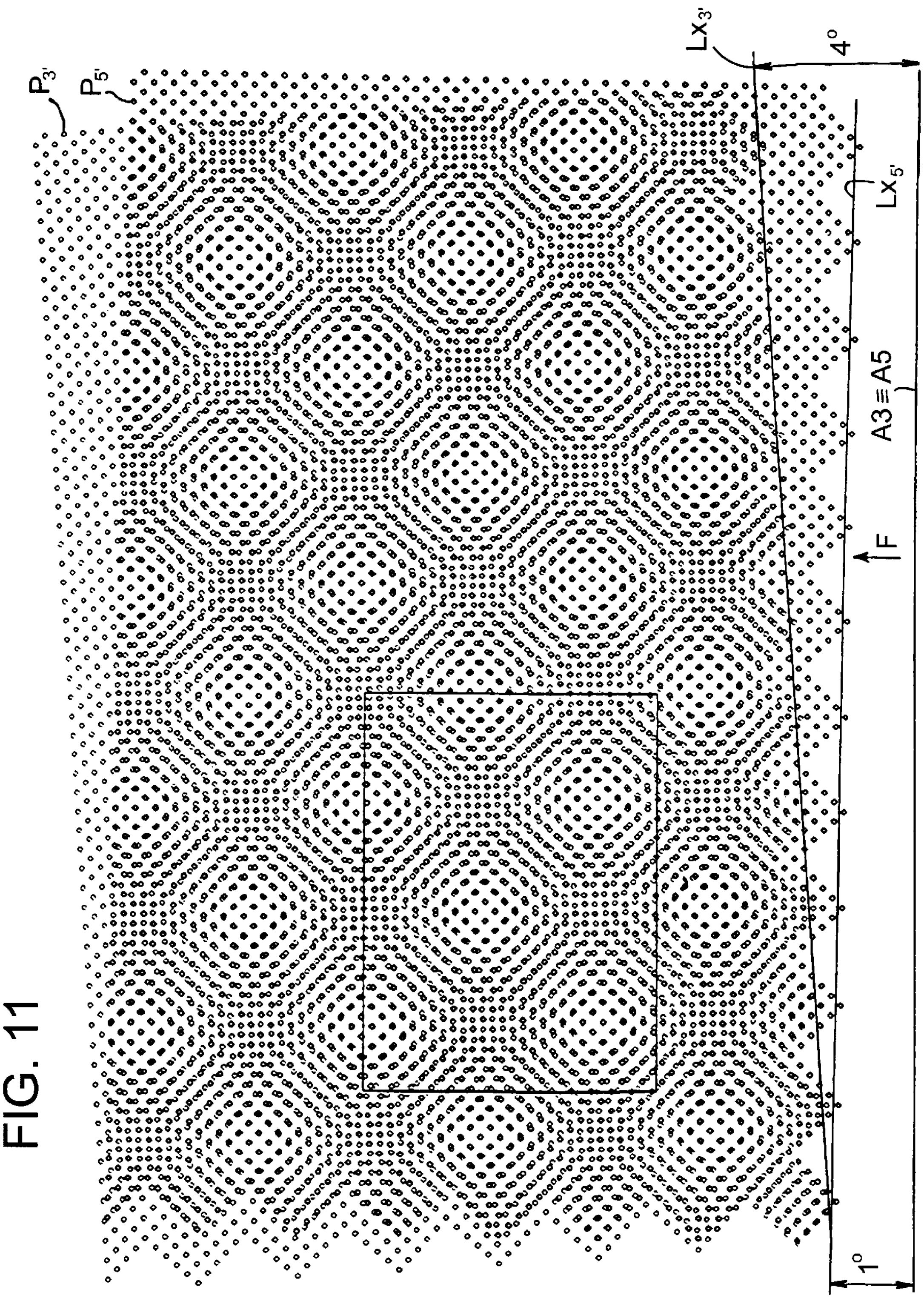
FIGS. 11 and 12 show a view of two joined layers and an enlargement of the glued areas of the layers produced with a further different inclination of the directions of alignment of the protuberances on the two embossing cylinders.
Figure 12:
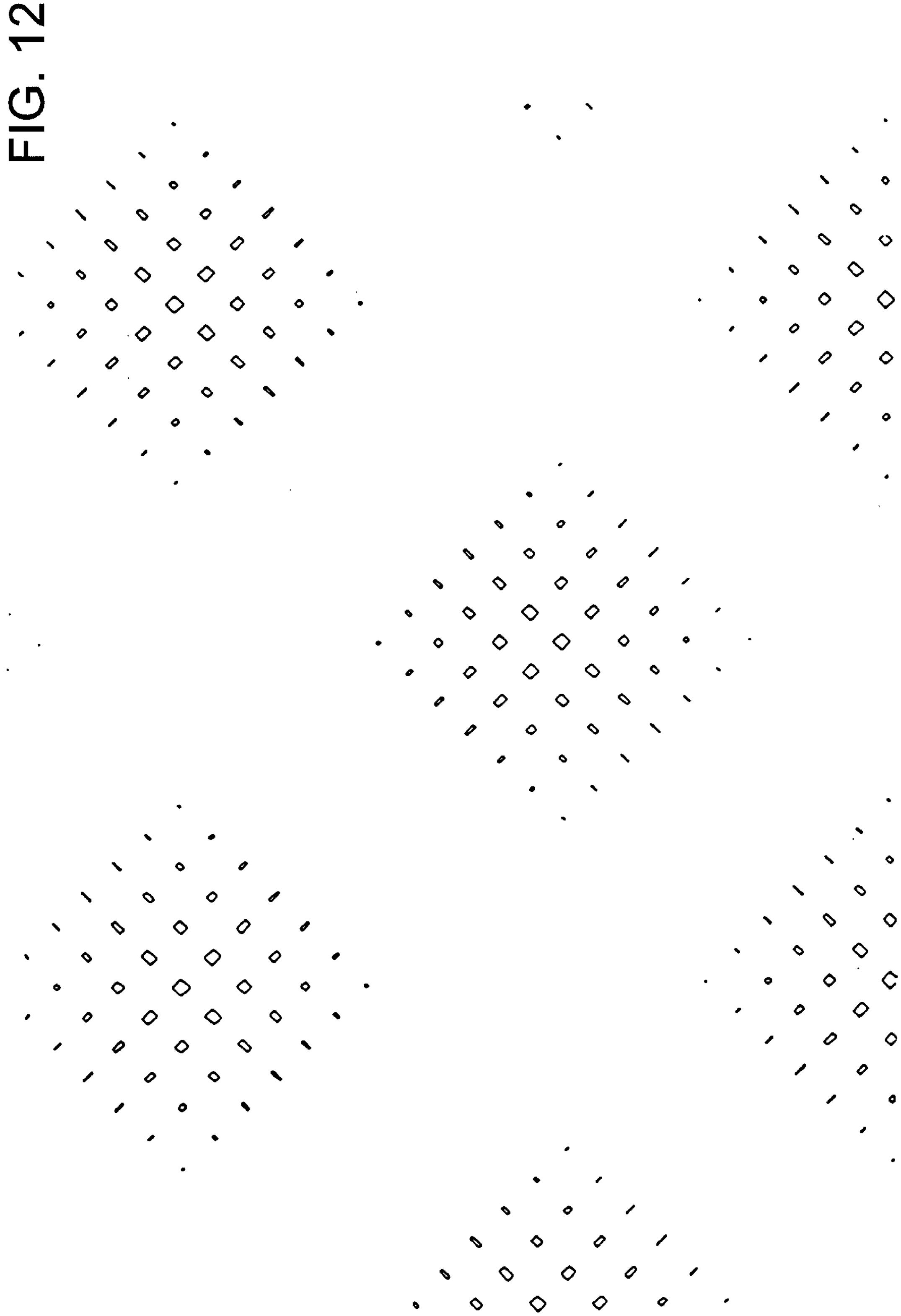

FIGS. 7, 9 and 11 show portions of the joined strip material produced with different inclinations of the directions of alignment $Lx_3$ and $Lx_5$. In particular, in FIG. 7 the two directions $Lx_3$ and $Lx_5$ are inclined at 7° and 2° respectively, in FIG. 9 they are inclined at 6° and 1°, and in FIG. 11 they are inclined at 4° and 1°. FIGS. 8, 10 and 12 show enlargements of portions of FIGS. 7, 9 and 11 in which, for the sake of simplicity, only the areas of contact between the two joined layers N3 and N5 are shown. In the enlargements, the perimeters of the areas of contact between the two layers N3 and N5 are marked, while the protuberances which are not in contact with each other are not shown. The purpose of this is to show the arrangement of the areas of reciprocal contact between the two layers more clearly.

Identical references indicate elements identical or corresponding to those indicated in FIGS. 2 to 4.

Figure 16:
FIG. 16 shows, in a view corresponding to that in FIG. 7, two joined layers produced by a different embodiment of the invention.

FIG. 16 shows a portion of strip material produced by joining two layers embossed according to a different embodiment of the invention. Identical numbers indicate parts and elements which are identical or correspond to those shown in the preceding figures. By contrast with what is shown in FIG. 7, in the embodiment shown in FIG. 16 the directions of alignment $Lx_3'$ and $Lx_5'$ are inclined in the same direction with respect to the direction A5-A3 indicating the orientation of the axes of the cylinders 3 and 5. The angles $\beta_3$ and $\beta_5$ formed by the directions of alignment $Lx_3'$ and $Lx_5'$ with the direction of the axes of the cylinders are different from each other. This arrangement on the embossed layers corresponds to an arrangement on the embossing cylinders such that the directions of alignment $Lx_3$ and $Lx_5$ are inclined in opposite directions and with different angles with respect to the axes $A_3$ and $A_5$. In other words, the two cylinders are provided with two spiral alignments, one with right-hand winding and the other with left-hand winding, and with two different angles. In this case also, as is clearly shown in FIG. 16, although approximately the same pitch is maintained between the protuberances formed on the two cylinders, the two layers $N_3$ and $N_5$ are connected together only in certain areas, with only partial correspondence between the protuberances $P_3'$ of one layer and the protuberances $P_5'$ of the other layer.

In the preceding text, reference has been made to protuberances of truncated pyramidal form, which are the most common. These are easily produced using simple machining processes, for example by chip-forming machining. In this case, the directions of alignment coincide with the directions of the diagonals of the quadrilateral bases of the truncated pyramids. However, different forms of protuberance are not excluded.

Additionally, the inclination characteristics described above of the directions of alignment of the protuberances may be uniform over the whole of the corresponding cylinder; in other words, the directions $Lx_3$, $Ly_3$, $Lx_5$ and $Ly_5$ may have the same inclination over the whole longitudinal development of the embossing cylinder 3 or 5 respectively. However, this is not essential, and the inclination of the directions of alignment may vary gradually along the axis of the cylinder, or may vary over successive sections of the cylinder.

Since the two embossing cylinders 3, 5 are in contact with each other (with the interposition of the layers N3, N5) only at some of the protuberances along the tangency generatrices of the two cylinders, the specific pressure exerted at the said protuberances in contact is higher than that exerted between the opposing protuberances of a conventional tip-to-tip embossing machine, in which all the protuberances are in contact with each other. It is therefore extremely important to control the pressure between the rollers so as to avoid excessive crushing in the areas of reciprocal contact. For this purpose, it is possible, for example, for the two embossing cylinders 3, 5 to be thermostatically controlled. It has been found that, by adjusting the embossing cylinders 3, 5 in such a way that there is a gap of 0.05 mm between them when the machine is cold, this gap is eliminated after twenty minutes of operation, owing to the radial expansion of the embossing cylinders due to the rise in temperature during operation (caused by the interaction with the pressure rollers which are deformed cyclically and therefore become hot). With a thermostatic control system, for example using a heat transfer fluid which circulates in the embossing cylinders 3, 5, it is possible to bring the temperature of the cylinders to a steady level before the start of the operating cycle, by setting the correct gap between the points, which then remains unchanged throughout the operation.

Additionally, or alternatively, it is possible to use a system for controlling the pressure between the embossing cylinders 3, 5 which maintains this pressure at a constant level. This system is shown schematically in FIG. 1. The second embossing cylinder 5 and the second pressure roller 9 are carried by an oscillating moving element 16, pivoted at 16A on the structure of the machine and pressed by a cylinder and piston actuator 18 against a fixed stop 20. A movable and adjustable stop 22 carried by an extension 24 of the moving element 16 interacts with the fixed stop 20. The fixed stop is provided with a load cell which sends a signal proportional to the force exerted by the moving stop 22 to the control unit. When the geometry of the system, the force exerted by the cylinder and piston actuator 18 and the force detected by the load cell on the fixed stop 20 are known, it is possible to deduce the reaction power between the two embossing cylinders 3, 5. Consequently, by keeping constant the force detected by the load cell (by the continuous adjustment of the adjustable stop 22 by means of a dedicated actuator) it is possible to keep the pressure between the embossing cylinders 3, 5 constant at a predetermined value.

Normally, the embossing cylinders 3, 5 are made with equal diameters and are connected together mechanically by a pair of gears with equal numbers of teeth, so that they have the same rotation speed. Since, with the protuberance arrangement according to the present invention, the reciprocal stresses are present in restricted areas of the embossing cylinders and always only in these areas, it is advantageous, in order to avoid concentrating the deformations as a result of the protuberances of the cylinders being crushed, to make the said cylinders with slightly different diameters. Normally the embossing cylinders have diameters of 500/600 mm. With diameters of this order of magnitude it is possible to make two cylinders which have a difference of approximately 10/15 mm in their diameters. This solution is shown schematically in FIGS. 13 and 14, where the cylinders 3 and 5 have different diameters. The difference in diameter has been exaggerated from the real difference for the sake of clarity. By using a pair of gears which have different numbers of teeth (as indicated by the numbers 31 and 33 in FIG. 14), it is possible to make the peripheral velocities of the two cylinders equal. In this way, the contact between their protuberances is always different, thus distributing the wear over all the protuberances on the two cylinders.

Figure 15:
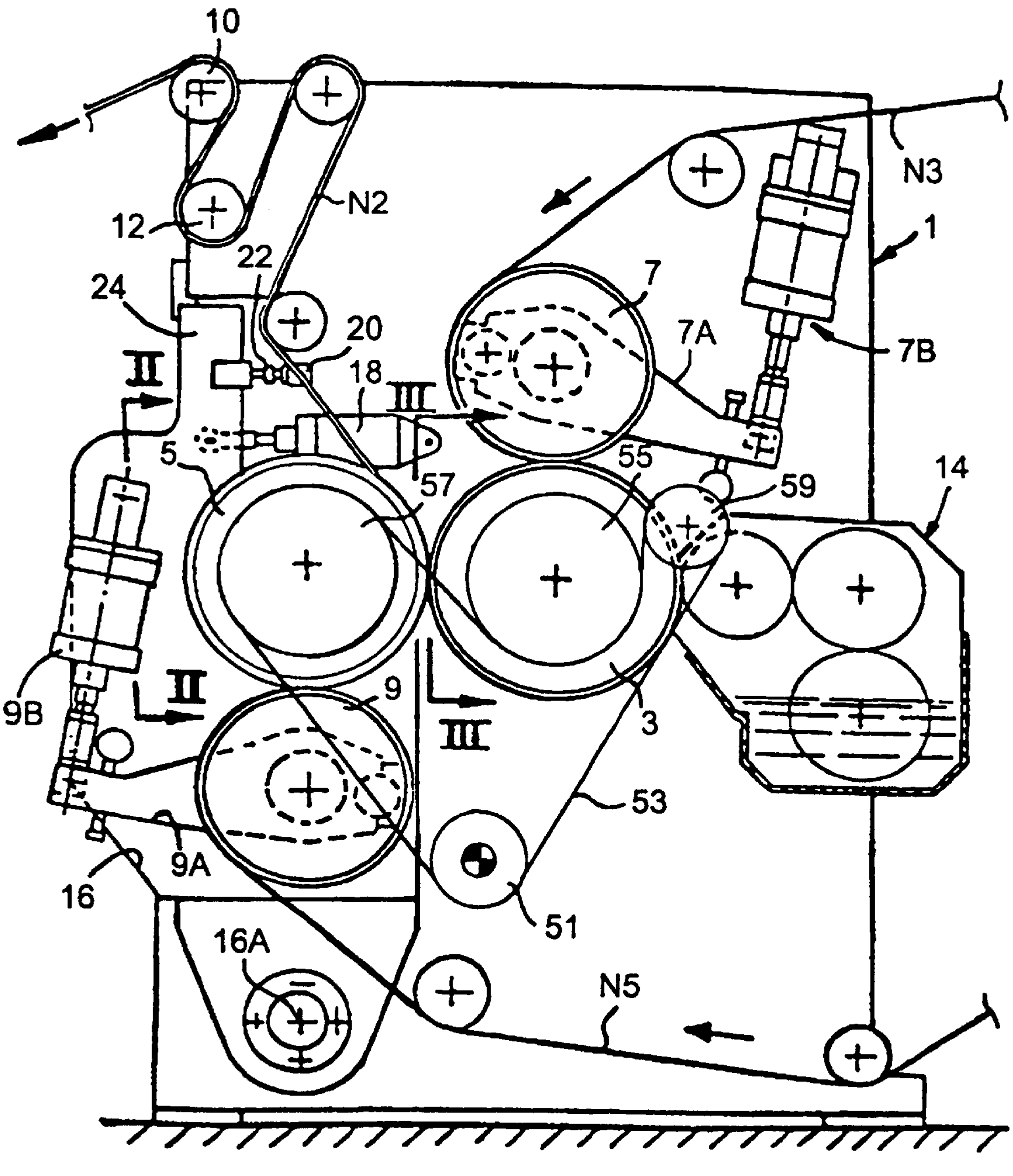
FIG. 15 shows a particular type of transmission of motion to the embossing cylinders.

It has also been found that, by having the embossing cylinders cut according to the invention, and thus obtaining embossing with contact between the cylinders in certain areas only, instead of over the whole surface of the sheet product, it is possible to dispense with in-phase transmission and with exact synchronization between the two embossing cylinders. Instead of connecting the cylinders together mechanically by means of a pair of gears (as is normally the case in tip-to-tip embossing machines), it is possible to use, for example, a belt transmission, as shown in FIG. 15. The belt transmission causes slight slippage between the first and second embossing cylinders, the extent of which is not sufficient to have a negative effect on correct operation of the embossing machine, but is sufficient to ensure that the areas of reciprocal contact between the two embossing cylinders move gradually over the surfaces of the cylinders, causing uniform wear of the cylinders. FIG. 15 shows schematically a driving pulley 51 around which a belt 53 runs. This belt runs around further pulleys 55 and 57, keyed to the axles of the embossing cylinders 3 and 5 respectively, the path of the belt being such that the two cylinders rotate in opposite directions (in the example, the cylinder 3 rotates clockwise and the cylinder 5 rotates anti-clockwise). The number 59 indicates a tensioning jockey pulley which allows the two cylinders 3 and 5 to be moved apart and enables the gap between the cylinders to be adjusted. The use of this type of transmission, or of another type which does not prevent the phase slip between the two cylinders 3 and 5, is also particularly advantageous by comparison with the conventional precision gear transmissions always used in tip-to-tip embossing machines because there is no need to reset the play between the gears or to lubricate them.

It should be understood that the drawing shows only an example provided solely as a practical demonstration of the invention, and that this invention may vary in its forms and arrangements without departing from the scope of the guiding concept of the invention. Any reference numbers in the claims have the purpose of facilitating the reading of the claims with reference to the description and to the drawing, and do not limit the scope of protection represented by the claims.

What is claimed is:

1. An embossed sheet product comprising at least two layers which are embossed separately and glued together, each of said two layers having the same embossed pattern consisting of a plurality of protuberances disposed in a repeated geometrical pattern in two directions of alignment forming an angle other than zero between them, wherein the directions of alignment of said protuberances of a first layer are inclined with respect to the corresponding directions of alignment of said protuberances of a second layer, less than all of said protuberances of said first layer and of said second layer being in contact with each other, and the pitch of the pattern of protuberances of said first layer and said second layer are equal.

2. The sheet product according to claim 1, wherein the areas of contact between the protuberances of the first layer and the protuberances of the second layer are aligned in two directions which are parallel and perpendicular respectively to the longitudinal development of the sheet product.

3. The sheet product according to claim 1, wherein the areas of contact between the protuberances of the first layer and the protuberances of the second layer are aligned in two directions inclined with respect to the longitudinal development of the sheet product.

4. An embossing and laminating machine comprising:

(a) a first embossing cylinder, said first embossing cylinder comprising:

(1) a first axis, and (2) a first cylinder surface, said first cylinder surface provided with a first set of protuberances arranged in a first direction of alignment and in a second direction of alignment, said first direction of alignment being inclined with respect to said first axis;

(b) a second embossing cylinder, said second embossing cylinder comprising (1) a second axis, and (2) a second surface provided with a second set of protuberances arranged in a third and in a fourth direction of alignment, said third direction of alignment being inclined with respect to said second axis; and (c) a laminating nip formed between said first embossing cylinder and said second embossing cylinder, wherein said first and third directions of alignment are oriented with respect to said first and said second horizontal axes such that less than all said first set of protuberances laminate to said second set of protuberances in said laminating nip.

5. The embossing and laminating machine of claim 4, wherein said first set of protuberances and said second set of protuberances are arranged in the same pitch in either said first and third directions of alignment, said second and fourth directions of alignment, or all four directions of alignment.

6. The embossing and laminating machine of claim 4, wherein said third and said fourth directions of alignment form between them an angle approximately equal to the angle formed between said first and said second directions of alignment.

7. The embossing and laminating machine of claim 5, wherein said third and said fourth directions of alignment form between them an angle approximately equal to the angle formed between said first and said second directions of alignment.

8. The embossing and laminating machine of claim 7, wherein said first set of protuberances and said second set of protuberances are arranged in the same pitch in said first and third directions of alignment and said second and fourth directions of alignment.

9. The embossing and laminating machine of claim 4, wherein said second direction of alignment is not perpendicular to said first axis, said fourth direction alignment is not perpendicular to said second axis, or both.

10. The embossing and laminating machine of claim 4, wherein the inclination between said first direction of alignment and said first axis and the inclination between said third direction of alignment and said second axis are different.

11. The embossing and laminating machine of claim 4, wherein said first direction of alignment and said third direction of alignment are inclined in the same direction with respect to said first and said second axes.

12. The embossing and laminating machine of claim 11, wherein said first and said third direction of alignment have the same inclination with respect to said first and said second horizontal axes.

13. The embossing and laminating machine of claim 4, wherein said first direction of alignment and said third direction of alignment are inclined in opposite directions with respect to said first and said second axes.

14. The embossing and laminating machine of claim 13, wherein the angle formed between said first direction of alignment and said first axis and the angle formed between said third direction of alignment and said second axis are not equal.

15. The embossing and laminating machine of claim 4, wherein said first set of protuberances and said second set of protuberances are in the form of truncated pyramids.

16. The embossing and laminating machine of claim 15, wherein said truncated pyramidal protuberances have a quadrilateral section.

17. The embossing and laminating machine of claim 16, wherein said first and said second directions of alignment are parallel to the two diagonals of the minor base of each protuberance of said first set of protuberances, and said third and said fourth directions of alignment are parallel to the two diagonals of the minor base of each protuberance of said second set of protuberances.

18. The embossing and laminating machine of claim 4, wherein said first set of protuberances and said second set of protuberances have a density of between 6 and 150 protuberances per cm.

19. The embossing and laminating machine of claim 18, wherein said first set of protuberances and said second set of protuberances have a density of between 10 and 60 protuberances per cm.

20. The embossing and laminating machine of claim 4, wherein said two embossing cylinders are kept at a controlled temperature during operation.

21. The embossing and laminating machine of claim 4, further comprising a load cell which sends a signal proportional to the pressure between said first embossing cylinder and said second embossing cylinder, and a control system which, on the basis of said signal, keeps the pressure between said embossing cylinders constant.

22. The embossing and laminating machine of claim 4, wherein said first embossing cylinder and said second embossing cylinder have different diameters and are driven with a peripheral velocity of equal modulus.

23. The embossing and laminating machine of claim 4, wherein less than all of said laminating protuberances of said first set of protuberances and said second set of protuberances directly coincide in said laminating nip.

24. A method of forming an embossed material comprising:

(a) providing a first layer of material and a second layer of material, (b) embossing said first layer of material by forming a first set of protuberances thereon in a first direction of alignment and a second direction of alignment, (c) embossing said second layer by forming a second set of protuberances thereon in a third direction of alignment and a fourth direction of alignment, and (d) joining said first and second layers to form an embossed material, wherein said first and said third directions of alignment are arranged such that, when said two layers are joined, said first and third directions of alignment are not parallel and less than all of said first set of protuberances contact said second set of protuberances.

25. The method of claim 24, wherein said first set of protuberances and said second set of protuberances are arranged in the same pitch in either said first and third directions of alignment, said second and fourth directions of alignment, or both.

26. The method of claim 24, wherein said third and said fourth directions of alignment form between them an angle approximately equal to the angle formed by said first and said second directions of alignment.

27. The method of claim 24, wherein less than all of the contacting protuberances of said first set of protuberances and said second set of protuberances directly contact each other.

28. A method of forming an embossed material comprising:

(a) providing a first layer of material and a second layer of material, (b) feeding said first layer of material and said second layer of material, in a machine direction, to an embossing machine capable of forming protrusions on said first and said second layers of material, (c) forming a first set of protuberances in a first direction of alignment and a second direction of alignment on said first layer, (d) forming a second set of protuberances in a third direction of alignment and a fourth direction of alignment on said second layer, and (e) joining said first and second layers to form an embossed material, wherein said first direction of alignment and said third direction of alignment are arranged such that, when said first and second layers are joined, said first and said third directions of alignment are not parallel such that less than all of said first set of protuberances contact said second set of protuberances, and said first direction of alignment and said second direction of alignment form two equal angles with respect to said machine direction, such that the areas in which said first set of protuberances and said second set of protuberances contact are aligned in a fifth direction of alignment and a sixth direction of alignment, wherein said fifth direction of alignment and said sixth direction of alignment are parallel and perpendicular, respectively, to said machine direction.

29. A method of forming an embossed material comprising:

(a) providing a first layer of material and a second layer of material, (b) feeding said first layer of material and said second layer of material, in a machine direction, to an embossing machine capable of forming protrusions on said first and said second layers of material, (c) forming a first set of protuberances in a first direction of alignment and a second direction of alignment on said first layer, (d) forming a second set of protuberances in a third direction of alignment and a fourth direction of alignment on said second layer, and (e) joining said first and second layers to form an embossed material, wherein said first direction of alignment and said third direction of alignment are arranged such that, when said first and second layers are joined, said first and said third directions of alignment are not parallel, such that less than all of said first set of protuberances contact said second set of protuberances, and said first direction of alignment and said third direction of alignment form two different angles with respect to said feed direction, such that the areas in which said first set of protuberances and said second set of protuberances contact are aligned in a fifth direction of alignment and a sixth direction of alignment, wherein said fifth direction of alignment is inclined with respect to said machine direction.

* * * * *